(12) United States Patent
Boutaghou et al.

(10) Patent No.: US 6,275,454 B1
(45) Date of Patent: Aug. 14, 2001

(54) MICROACTUATOR FOR TRACK POSITIONING A SLIDER-MOUNTED LENS OF AN OPTICAL DISC DRIVE

(75) Inventors: Zine-Eddine Boutaghou, Vadnais Heights; Lowell James Berg, Minnetonka, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/006,799

(22) Filed: Jan. 14, 1998

Related U.S. Application Data
(60) Provisional application No. 60/055,912, filed on Aug. 18, 1997.

(51) Int. Cl.[7] .................................................. G11B 7/12
(52) U.S. Cl. ................................. 369/44.19; 369/44.14; 369/44.15; 369/112
(58) Field of Search .......................... 369/44.19, 44.21, 369/44.14, 44.15, 44.26, 43, 112, 44.23, 44.12, 44.22

(56) References Cited

U.S. PATENT DOCUMENTS

| | | | |
|---|---|---|---|
| 4,914,725 | 4/1990 | Belser et al. | 318/560 |
| 5,623,461 | 4/1997 | Sohmuta | 369/32 |
| 5,764,613 | * 6/1998 | Yamamoto et al. | 369/44.14 X |
| 5,828,644 | * 10/1998 | Gage et al. | 369/44.14 X |

OTHER PUBLICATIONS

Kusamuta, Yoshitoshi, NEC Corp, Patent Abstracts of Japan, Application No. 06–311597, Optical Disk Device, Jun. 25, 1996.

* cited by examiner

*Primary Examiner*—Muhammad Edun
(74) *Attorney, Agent, or Firm*—Kinney & Lange (57) ABSTRACT

A slider assembly for an optical disc drive includes a flyable slider supporting a pad with a pair of piezoelectric beams mounted to the pad to extend in spaced relation over the slider. An objective lens is mounted to the beams as to be cantilevered over the slider body. The beams are operable to deflect along the yawl axis of the slider to thereby move the objective lens and alter the position of the focal point. When operated independently, the beams rotate the objective lens about the roll axis of the slider to alter the radial position of the focal point. When operated together, the beams move the objective lens to focus the focal point relative to the recording medium. The beams are optionally operable to deflect along the pitch axis of the slider to thereby radially move the objective lens and alter the position of the focal point.

24 Claims, 6 Drawing Sheets

MICROACTUATOR FOR TRACK POSITIONING A SLIDER-MOUNTED LENS OF AN OPTICAL DISC DRIVE

CROSS-REFERENCE TO RELATED APPLICATION(S)

This application claims priority of Provisional Application No. 60/055,912 filed Aug. 18, 1997 for "MICROPOSITIONING METHOD FOR LENSES" by Zine-Eddine Boutaghou and Lowell James Berg.

BACKGROUND OF THE INVENTION

This invention relates to optical disc drives, and particularly to high density optical disc drives that employ lenses supported on sliders that aerodynamically control head/disc spacing.

Run-out, in an optical disc drive, is the condition of variations in distance between the head and disc surface that leads to defocus of the objective lens. Run-out is caused by a lack of parallelism between the lens and disc surface, which in turn is caused by a number of factors, including unbalanced forces acting on the disc drive spindle, vibration, external noise, disc warpage, lack of perpendicularity of the disc spindle, and lateral motion of the spindle caused by ball bearing imperfections, to name a few. Many optical disc drives employ an objective lens positioned at a fixed location relative to the platform supporting the disc. Variations in the flatness in the disc, therefore, is the most common cause of run-out in such optical disc drives. Where the objective lens is mounted to a flying slider, disc run-out will be of less impact on lens focus because the slider follows undulations of the disc surface.

The density, or radial spacing, between concentric data tracks, on optical discs continue to increase, requiring greater precision of lens positioning. Conventional drives employing flying sliders accomplish lens positioning by operating an actuator arm with a large scale motor, such as a voice coil motor, to position a lens\slider on a gimbal at the end of the actuator arm. However, the large scale motor lacks sufficient resolution to effectively accommodate high track-density discs. Thus, a high resolution lens positioning mechanism is necessary to accommodate more densely spaced tracks.

BRIEF SUMMARY OF THE INVENTION

A slider assembly for an optical disc drive in accordance with the present invention comprises a slider body having an aerodynamic surface arranged to fly a design distance from a recording surface of a recording medium when the recording medium is rotated about a medium axis at its operating velocity. An objective lens is supported by the slider and defines a focal point located at a fixed position relative to the lens. A microactuator is mounted to the slider body and supports the objective lens to selectively alter the radial position of the focal point relative to the medium axis.

In a preferred embodiment of the slider assembly, the microactuator includes a pad supported by the slider body. A micromotor beam, such as a pair of piezoelectric beams, are mounted to the pad and extend in spaced relation over the slider body. The objective lens is mounted to the micromotor beam as to be cantilevered over the slider body. The micromotor beam is operable to move the objective lens relative to the slider body to thereby rotate the objective lens about the roll axis and radially alter the position of the focal point.

In one form of the slider assembly, the pair of piezoelectric beams include conductive patterns to operate the piezoelectric beams to deflect in a direction along the yawl axis of the slider body. The first and second beams rotate the objective lens about the roll axis when operated at different voltages, and operate to rotate the objective lens about the pitch axis of the slider body to adjust the focus of the objective lens when operated at design polarities.

In another form of the slider assembly, the piezoelectric beans include conductive patterns having first portion to operate the piezoelectric beams to deflect in a direction along the yawl axis of the slider body to focus the objective lens relative to the recording surface, and a second portion to operate the piezoelectric beams to deflect in a direction along the pitch axis of the slider body to radially position the focal point.

In a preferred embodiment, the objective lens defines a light path through the slider body between the lens and the focal point, and a solid immersion lens is mounted to the slider body in the light path.

In accordance with another aspect of the present invention, an optical disc drive has a rotatable optical recording medium having a recording surface with a plurality of concentric radial tracks along which data may be recorded as marks having distinctive optical characteristics and along which data may be recovered by optically sensing marks when the recording medium is rotated at an operating velocity. An optical system has a light source for supplying light, an objective lens for directing light supplied by the light source at the recording surface, and a light detector operatively associated with the objective lens to receive light reflected from the recording surface. The objective lens defines a focal point at a position relative to the lens. A slider assembly supports the objective lens. An actuator arm supports the slider at a selected radial position adjacent the optical recording medium. The slider has an aerodynamic surface to fly a design distance from the recording surface when the recording medium is rotated at the operating velocity. A microactuator on the slider assembly is operable to selectively alter the radial position of the focal point relative to the slider.

Another aspect of the present invention is a method of radially positioning the focal point of an objective lens of a disc drive optical system in which the optical system includes an actuator arm having a slider which supports the objective lens and is arranged to fly a design distance from a recording surface of an optical recording medium when the recording medium is rotated at an operating velocity. The method comprises flying the slider a design distance from the recording surface, and selectively positioning the objective lens relative to the slider to selectively alter the radial position of the focal point relative to the recording surface.

The objective lens is advantageously mounted to a pair of cantilevered micromotor beams. In one embodiment, the beams are independently deflected in a direction along the yawl axis of the slider to rotate the objective lens about the roll axis.

In another embodiment, the beams are independently deflected in a direction along the pitch axis of the slider to move the objective lens along the pitch axis. In this embodiment, the beams may also be deflected along the yawl axis of the slider to focus the objective lens relative to the recording surface.

DETAILED DESCRIPTION OF THE PREFERRED EMBODIMENTS

Figure 1:
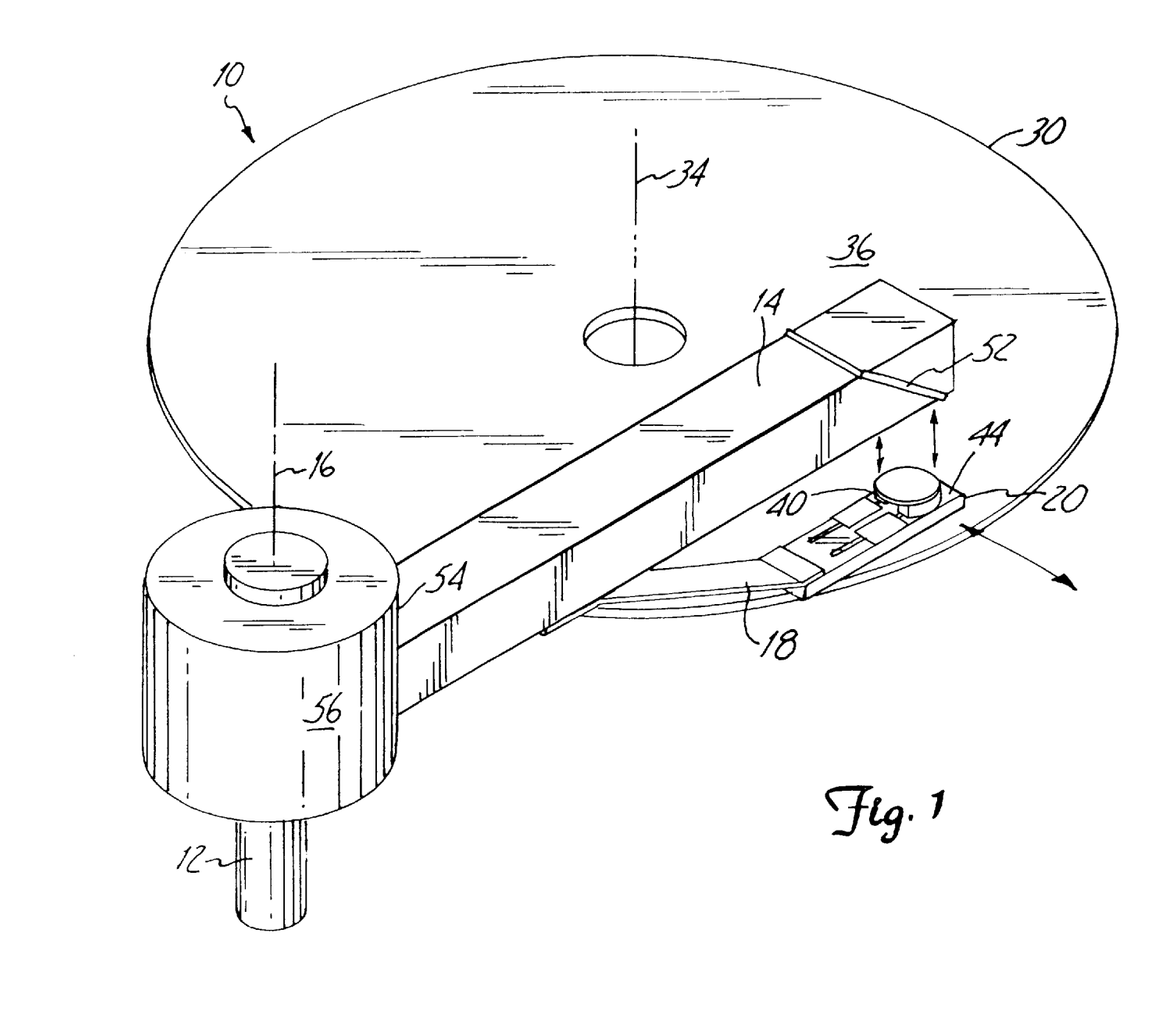
FIG. 1 is a perspective view of an optical disc drive in accordance with the presently preferred embodiment of the present invention.
Figure 2:
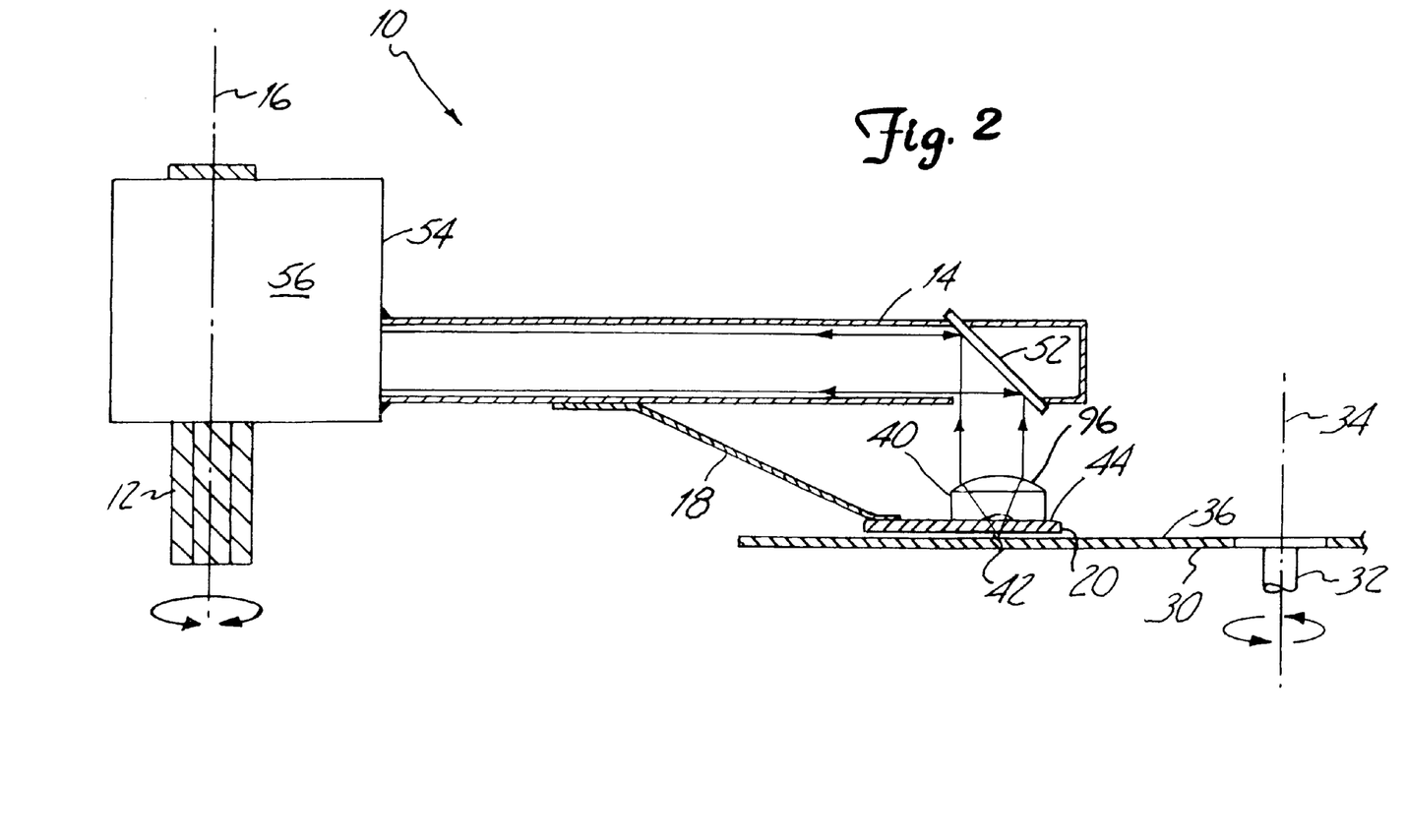
FIG. 2 is a section view of a rotary actuator arm and optics of the disc drive of FIG. 1.

FIGS. 1 and 2 illustrate a rotary actuator assembly for an optical disc drive in accordance with the presently preferred embodiment of the present invention. The actuator assembly includes an actuator spindle 12 having a hollow actuator arm 14 mounted thereto for rotation about actuator axis 16. A gimbal spring 18 is mounted to actuator arm 14 and carries a slider 20. In one embodiment, the body of slider 20 is formed of transparent cubic zirconia, and one or more rails 22 (FIGS. 4B–7B) having smooth aerodynamic surfaces 24 extend along the slider body to confront optical disc 30. Disc 30 is mounted to spindle 32 to rotate about disc axis 34 at a design operational velocity. When so rotating, windage associated with disc 30 reacts against aerodynamic surfaces 24 of slider 20 to cause slider 20 to "fly" a design distance above surface 36 of disc 30. As is well known in the art, the aerodynamic characteristics of slider 20, together with the spring bias of gimbal 18 and any load beam (not shown) imposed on gimbal 18, causes slider 20 to "fly" the design distance from confronting surface 36 of disc 30. Lens assembly 40 is supported by slider 20 and includes an objective lens 96 having a focal point 42 in fixed position to the lens. Actuator arm 14 supports mirror 52 immediately adjacent lens assembly 40. Housing 54 is supported by actuator spindle 12 and contains optical module 56 shown in greater detail in FIG. 3.

Slider 20 includes a microactuator 44 connected to slider 20 and supporting lens assembly 40. Microactuator 44 is arranged to adjust the position of lens 70 with respect to the body of slider 40 to alter the radical position of focal point 42 with respect to the slider to thereby move the focal point radially with respect to disc 30. Thus, when the disc is rotated at its operational velocity, microactuator 44 selectively adjusts the position of focal point 42 relative to a selected radial track.

Figure 3:
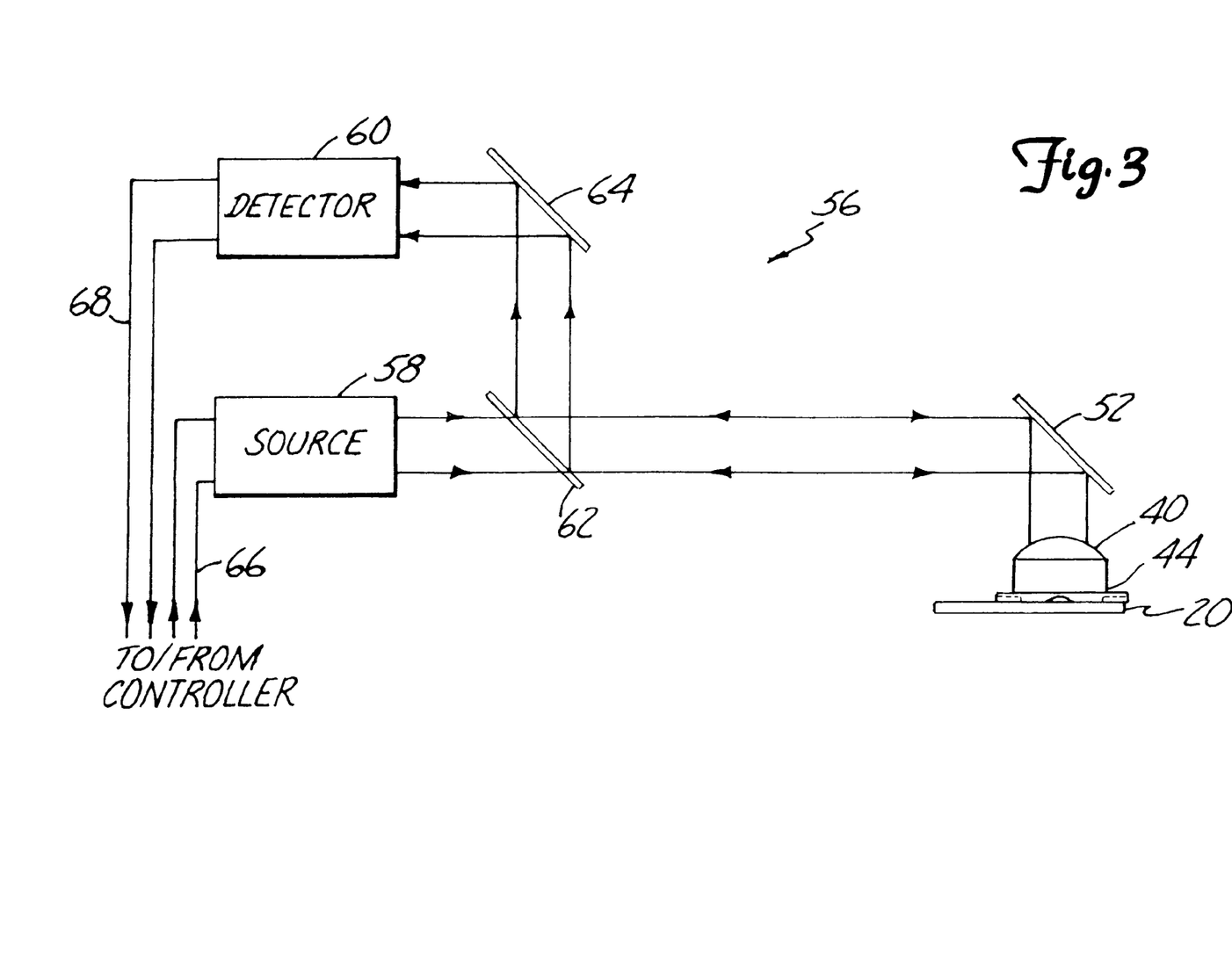
FIG. 3 is a schematic diagram of the optical paths of an optical module used in the optical disc drive of FIG. 1.

As shown particularly in FIG. 3, optical module 56 includes a laser light source 58 arranged to emit collimated light in the form of a beam, and a detector 60 arranged to detect collimated light. Splitter 62 is well-known in the art as a device that is partially transparent to light impinging it from one side and partially reflective of light impinging it from the opposite side. Splitter 62 is arranged in respect of source 58 to direct source light radiation from source 58 through splitter 62 and along a light path within arm 14 (FIG. 2) to mirror 52 where it is redirected through lens assembly 40 to focal point 42. Light reflected from disc 30 is transmitted through lens assembly 40, reflected by mirror 52 to splitter 62, reflected by splitter 62 to mirror 64 to impinge on detector 60. Source 58, which is a typical laser source well-known in the art, is operated via input leads 66 from the disc drive controller (not shown) and signals generated by detector 60 are provided via leads 68 to the controller. Other light paths may be included within module 56 as is well-known in the art. For example, light from the source 58 may be reflected by splitter 62 away from the detection light path for control purposes.

As is well-known in the art, information is written to disc 30 by applying digital signals from the controller to light source 58 to provide a pulsed laser output through lens assembly 40 to the surface of disc 30. The strength and wavelength of the laser pulses are such as to heat the surface of the optical disc to form optically distinctive marks or optical modifications in the otherwise reflective optical disc. Because the disc is rotating, these marks are recorded as a series of optical modifications along concentric tracks, the marks being recorded at a frequency and representing data in a matter well-known in the art. In the read mode, source 58 is operated continuously, usually at a lower power and slightly different optical wavelength than a write operation to provide light through lens assembly 40 to impinge on the surface 36 of disc 30. Marks on the disc have distinctive optical characteristics, to reflect the light differently than from areas where there are no such marks. As a result, the reflected light constitutes a series of light pulses representing the marks, and hence the data recorded on the disc. The reflected light is transmitted through lens assembly 40 and reflected by mirror 52, splitter 62 and mirror 64 to be detected by detector 60 as a series of light pulses of varying intensity, based on the reflections of light from the marks and regions where there are no marks (non-marks). The impinging light on detector 60 creates a digital signal which is transmitted back to the controller and recovered as data. While the present invention will be described in connection with an intensity-based readout, as might be employed with erasable phase change media, the invention is equally applicable to phase-based readout, as employed with CD-ROM media, and polarization-readout as employed with magneto-optical media.

The present invention is directed to a slider having a microactuator arranged to radially shift the position of the focal point 42 of lens assembly 40 for focusing on a track center, or even selecting different tracks. More particularly, the present invention is directed to a micromotor beam mechanism that is cantilevered to the slider and supports the lens assembly to move the focal point of the objective lens relative to the slider. The slider, micromotor and lens assembly may be explained with reference to FIGS. 4–7.

Figure 4A:
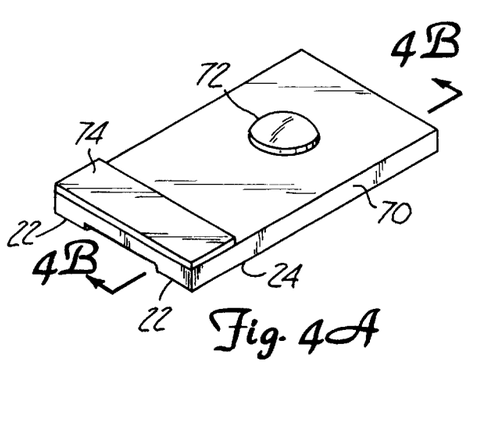
FIGS. 4A, 5A, 6A and 7A are perspective views.
Figure 4B:
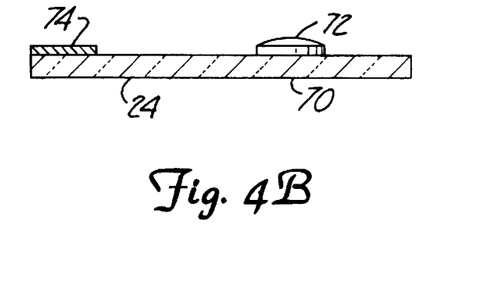
FIGS. 4B, 5B, 6B and 7B are section views taken at lines 4A—4A, 5A—5A, 6A—6A and 7A—7A, respectively, illustrating a succession of steps in fabricating a slider containing an objective lens and focus mechanism for the apparatus illustrated in FIG. 1.
Figure 5A:
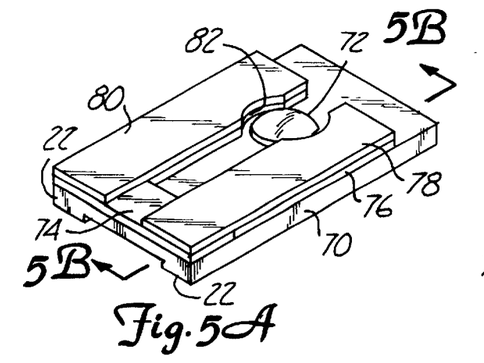
Figure 5B:
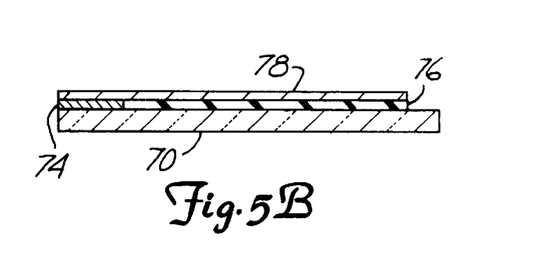

As shown in FIGS. 4A and 4B, a slider body 70 having rails 22 is formed of a transparent cubic zirconia material. Rails 22 have aerodynamic surfaces 24 to react against windage caused by rotating disc 30 to "fly" slider 70 a design distance from the disc surface. Solid immersion lens (SIL) 72 is formed on an upper surface of slider body 70 and a pad 74 formed of insulating material thermally compatible with the slider body is formed on the top surface of the of the slider at the leading edge. For example, pad 74 may be formed of a ceramic material. As shown in FIGS 5A and 5B, a layer of sacrificial material 76, such as a dissolvable resist, is formed on the top surface of slider body 70 to abut pad 74 and at the same height as pad 74. Piezoelectric layers 78 and 80 are formed on the sacrificial layer and on pad 74. As shown particularly, in FIG. 5B, there are two such piezoelectric layers 78 and 80 extending outwardly from pad 74 and together form an aperture 82 partly surrounding SIL 72.

Figure 6A:
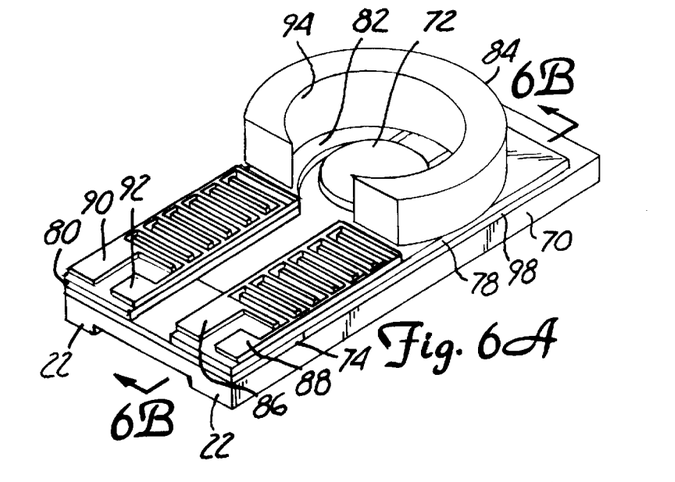
Figure 6B:
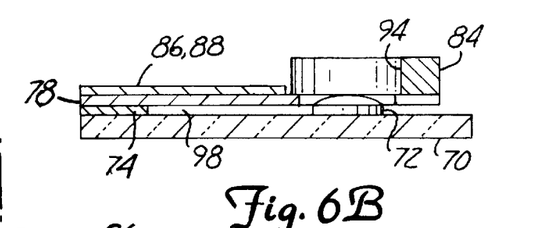

As shown in FIGS. 6A and 6B, lens base 84 is mounted to the distal or trailing ends of piezoelectric layers 78 and 80. Interleaved conductive leads 86 and 88 are formed on the upper surface of the proximal end of piezoelectric layer 78 and interleaved conductive leads 90 and 92 are formed on the upper surface of the proximal end of piezoelectric layer 80. The interleaved conductive patterns are disposed forwardly of lens base 84, which in turn forms an aperture 94 exposing SIL 72. Finally, and as illustrated particularly in FIGS. 7A and 7B, objective lens 96 is formed on base 84, covering apertures 94 and 82. Sacrificial layer 76 is dissolved away leaving space 98 below the distal or trailing ends of piezoelectric layers 78 and 80, beneath lens base 84 and lens 96. As a result piezoelectric layers 78 and 80 form cantilevered piezoelectric beams attached at one end to pad 74 and supporting the lens base 84 and lens 96 at the other end in a cantilevered fashion.

Figure 7A:
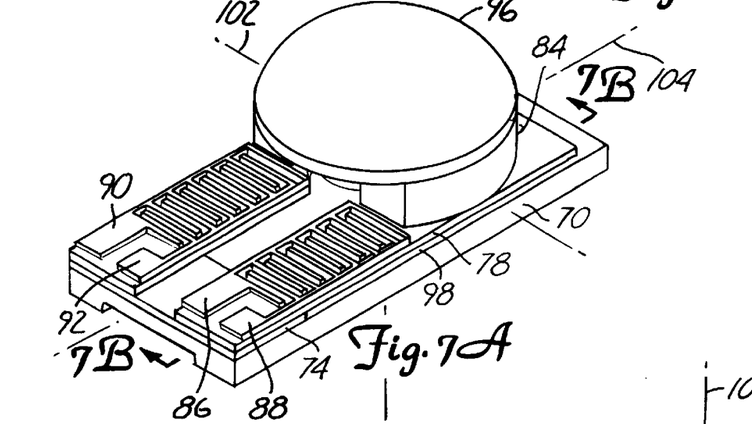
Figure 7B:
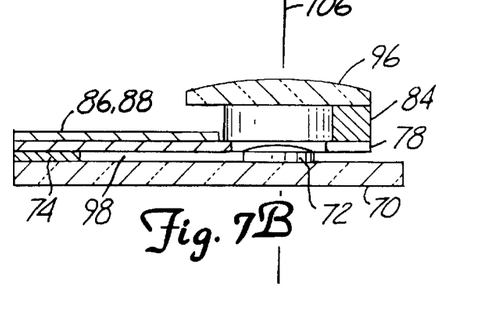

In operation, application of a voltage signal to leads 86 and 88 of cantilevered piezoelectric beam 78, and application of a different voltage signal to leads 90 and 92 of cantilevered piezoelectric beam 80, causes the cantilevered distal or trailing ends of those piezoelectric beams to bend in respectively different amounts around the pitch axis 102 extending across the width of slider body 70 so that the respective distal or trailing ends of beams 78 and 80 bend toward or away from slider body 70 along yawl axis 106 to different levels relative to the disc surface. Because piezoelectric beams 78 and 80 are bent to different levels, lens base 84 and lens 96 are rotated about the roll or longitudinal axis 104 of the slider. As a result, the focal point 42 of lens 96 is selectively moved radially inwardly or outwardly with respect to axis 34 of disc 30 (FIG. 1) to selectively position focal point 42 to a selected track.

While application of oppositely poled voltages to the contacts on beams 78 and 80 will result in the most dramatic movement of beams 78 and 80 around the pitch axis 102, resulting in roll of base 84 and lens 96 for track selection purposes, it is also possible to simultaneously adjust the focus of lens 96 on the selected track. More particularly, the focal position of lens 96 with respect to the surface of disc 30 may be adjusted by application of the same voltage to both piezoelectric beams 78 and 80, thereby causing equal bending of the beams around the pitch axis, thereby adjusting the focus of lens 96 with respect to a selected track. This might be done, for example, to correct for run-out, or to adjust the focal position of lens 96 for changes in wavelength between read and write modes as explained in the co-pending Gage et al. application Ser. No. 08/895,257, filed Jul. 15, 1997 for "Microactuator for Fine Focusing a Slider-Mounted Lens of an Optical Disc Drive", and assigned to the same assignee as the present application. Moreover, by selectively adjusting the voltage signals to piezoelectric beams 78 and 80, lens base 84 and lens 96 may be adjusted both around the roll axis 104 of slider body 70 to selectively position focal point 42 to a selected track, and around the pitch axis 102 of slider body 70 to selectively position focal point 42 for purposes of focusing lens 96.

Figure 8:
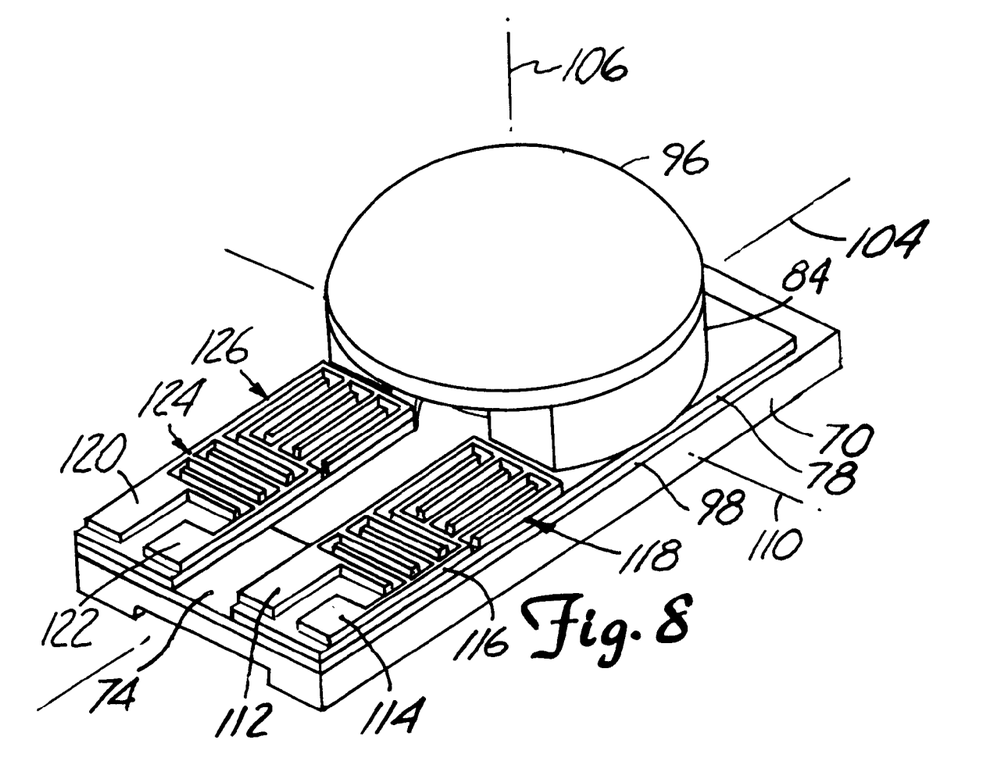
FIG. 8 is a perspective view, as in FIG. 7B, of a slider for use in the optical drive illustrated in FIG. 1 in accordance with a second embodiment of the present invention.

FIG. 8 illustrates a modification of the slider illustrated in FIG. 7B. Conductors 112 and 114 on piezoelectric beam 78 include a first section 116 to provide bending of piezoelectric layer 80 toward or away from disc 30 (around the pitch axis and along the yawl axis of the slider), and a second section 118, normal to the pattern of section 116, to bend piezoelectric beam 78 toward or away from disc axis 34 (around the yawl axis and along the pitch axis of the slider). Likewise, piezoelectric beam 80 includes patterns 120 and 122 having first and second portions 124 and 126 normal to each other to provide bending of piezoelectric beam 80 toward or away from disc 30 around the pitch axis 102 and toward or away from axis 34 around the yawl axis 106, respectively. As a result, the lens base and lens are controlled for movement about the pitch axis by bending beams 78 and 80 about the pitch axis, and for movement about the yawl axis by bending beams 78 and 80 about the yawl axis, to control both track selection and lens focus.

Although the present invention has been described with reference to preferred embodiments, workers skilled in the art will recognize that changes may be made in form and detail without departing from the spirit and scope of the invention.

We claim:

1. An optical disc drive having
   a rotatable optical recording medium having a recording surface having a plurality of concentric radial tracks along which data may be recorded as marks having distinctive optical characteristics and along which data may be recovered by optically sensing marks when the recording medium is rotated at an operating velocity;
   an optical system having
      a light source for supplying light,
      an objective lens for directing light supplied by the light source at the recording surface, the objective lens defining a focal point at a position relative to the lens, and
      a light detector operatively associated with the objective lens to receive light reflected from the recording surface;
   a slider supporting the objective lens;
   an actuator arm supporting the slider at a selected radial position adjacent the optical recording medium, the slider having an aerodynamic surface to fly a design distance from the recording surface when the recording medium is rotated at the operating velocity; and
   a microactuator on the slider operable to selectively alter the radial position of the focal point relative to the slider.

2. The optical disc drive of claim 1, wherein the objective lens defines a light path through the slider between the lens and the focal point, and a solid immersion lens mounted to the slider in the light path.

3. The optical disc drive of claim 1, including a motor for rotating the actuator arm about an actuator axis to thereby position the objective lens relative to the selected track, a mirror supported by the actuator arm direct light to and from the objective lens, the light source and light detector being supported by the actuator arm to direct light to and from the mirror.

4. The slider assembly of claim 1, wherein the microactuator comprises
   a pad supported by the slider,
   micromotor beam means mounted to the pad and extending in spaced relation over the slider, the objective lens being mounted to the micromotor beam means as to be cantilevered over the slider, the micromotor beam means being operable to move the objective lens relative to the slider to thereby radially alter the position of the focal point.

5. The slider assembly of claim 4, wherein the micromotor comprises first and second piezoelectric beams mounted to the pad and supporting the objective lens.

6. The slider assembly of claim 5, wherein the first and second piezoelectric beams include conductive patterns to operate the piezoelectric beams to deflect in a direction along a yawl axis of the slider.

7. The slider assembly of claim 6, wherein the conductive patterns of the first and second beams are operable at different voltages to rotate the objective lens about a roll axis of the slider.

8. The slider assembly of claim 6, wherein the different voltages are at a polarity to rotate the objective lens about a pitch axis of the of the slider to thereby adjust the focus of the objective lens.

9. The slider assembly of claim 6, wherein the conductive patterns of the first and second beams each includes a first portion to operate the piezoelectric beams to deflect in a direction along the yawl axis of the slider and a second portion to operate the piezoelectric beams to deflect in a direction along a pitch axis of the slider, whereby application of different voltages to the conductive patterns rotate the objective about both the roll axis and the yawl axis of the slider.

10. The optical disc drive of claim 4, wherein the objective lens defines a light path through the slider between the lens and the focal point, and a solid immersion lens mounted to the slider in the light path.

11. The optical disc drive of claim 4, including a motor for rotating the actuator arm about an actuator axis to thereby position the objective lens relative to the selected track, a mirror supported by the actuator arm direct light to and from the objective lens, the light source and light detector being supported by the actuator arm to direct light to and from the mirror.

12. A slider assembly for an optical disc drive comprising:
   a slider body having an aerodynamic surface arranged to fly a design distance from a recording surface of a recording medium when the recording medium is rotated about a medium axis at its operating velocity;
   an objective lens supported by the slider defining a focal point located at a fixed position relative to the lens; and
   a microactuator mounted to the slider body and supporting the objective lens to selectively alter the radial position of the focal point relative to the medium axis.

13. The slider assembly of claim 12, wherein the objective lens defines a light path through the slider body between the lens and the focal point, and a solid immersion lens mounted to the slider body in the light path.

14. The slider assembly of claim 12, wherein the microactuator comprises
   a pad supported by the slider body,
   micromotor beam means mounted to the pad and extending in spaced relation over the slider body, the objective lens being mounted to the micromotor beam means as to be cantilevered over the slider body, the micromotor beam means being operable to move the objective lens relative to the slider body to thereby radially alter the position of the focal point.

15. The slider assembly of claim 14, wherein the micromotor comprises first and second piezoelectric beams mounted to the pad and supporting the objective lens.

16. The slider assembly of claim 15, wherein the first and second piezoelectric beams include conductive patterns to operate the piezoelectric beams to deflect in a direction along a yawl axis of the slider body.

17. The slider assembly of claim 16, wherein the conductive patterns of the first and second beams are operable at different voltages to rotate the objective lens about a roll axis of the slider body.

18. The slider assembly of claim 16, wherein the different voltages are at a polarity to rotate the objective lens about a pitch axis of the of the slider body to thereby adjust the focus of the objective lens.

19. The slider assembly of claim 16, wherein the conductive patterns of the first and second beams each includes a first portion to operate the piezoelectric beams to deflect in a direction along the yawl axis of the slider body and a second portion to operate the piezoelectric beams to deflect in a direction along a pitch axis of the slider body, whereby application of different voltages to the conductive patterns rotate the objective about both the roll axis and the yawl axis of the slider body.

20. The slider assembly of claim 14, wherein the objective lens defines a light path through the slider body between the lens and the focal point, and a solid immersion lens mounted to the slider body in the light path.

21. A method of radially positioning the focal point of an objective lens of a disc drive optical system in which the optical system includes an actuator arm having a slider arranged to fly a design distance from a recording surface of an optical recording medium when the recording medium is rotated at an operating velocity, the slider body supporting a cantilevered micromotor beam which in turn supports the objective lens, the method comprising:
   flying the slider a design distance from the recording surface, and
   selectively deflecting the beam to move the objective lens relative to the slider to selectively alter the radial position of the focal point relative to the recording surface.

22. The method of claim 21, wherein the objective lens is mounted to a pair of cantilevered micromotor beams, and the movement of the objective lens is accomplished by independently deflecting the beams in a direction along the yawl axis of the slider to rotate the objective lens about the roll axis of the slider.

23. The method of claim 21, wherein the objective lens is mounted to a pair of cantilevered micromotor beams, and the movement of the objective lens is accomplished by independently deflecting the beams in a direction along the pitch axis of the slider to move the objective lens along the pitch axis.

24. The method of claim 23, including deflecting the beams in a direction along the yawl axis of the slider to focus the objective lens relative to the recording surface.

* * * * *

UNITED STATES PATENT AND TRADEMARK OFFICE
CERTIFICATE OF CORRECTION

PATENT NO. : 6,275,454 B1
DATED : August 14, 2001
INVENTOR(S) : Zine-Eddine Boutaghou et al.

It is certified that error appears in the above-identified patent and that said Letters Patent is hereby corrected as shown below:

Column 2,
Line 10, delete "beans", insert -- beams --
Line 10, after "having" insert -- a --

Column 6,
Line 43, after "arm", insert -- to --

Column 8,
Line 9, after "axis", delete the first occurrence "of the"

Signed and Sealed this

Ninth Day of April, 2002

Attest:

JAMES E. ROGAN
Attesting Officer
Director of the United States Patent and Trademark Office